Nov. 16, 1971  T. E. SLYKHOUSE  3,620,084
MINIATURE PRESSURE TRANSDUCER
Filed June 3, 1970
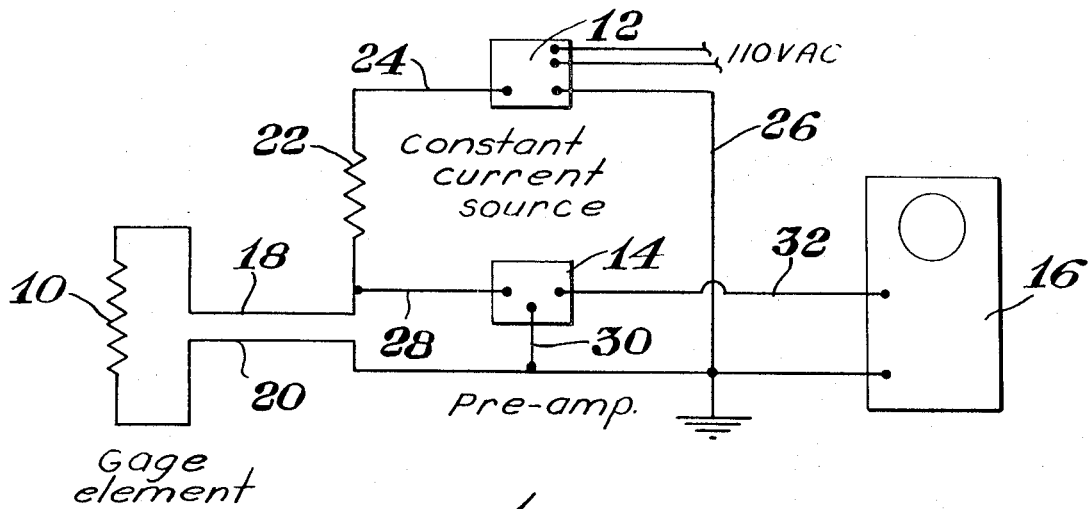
Fig. 1
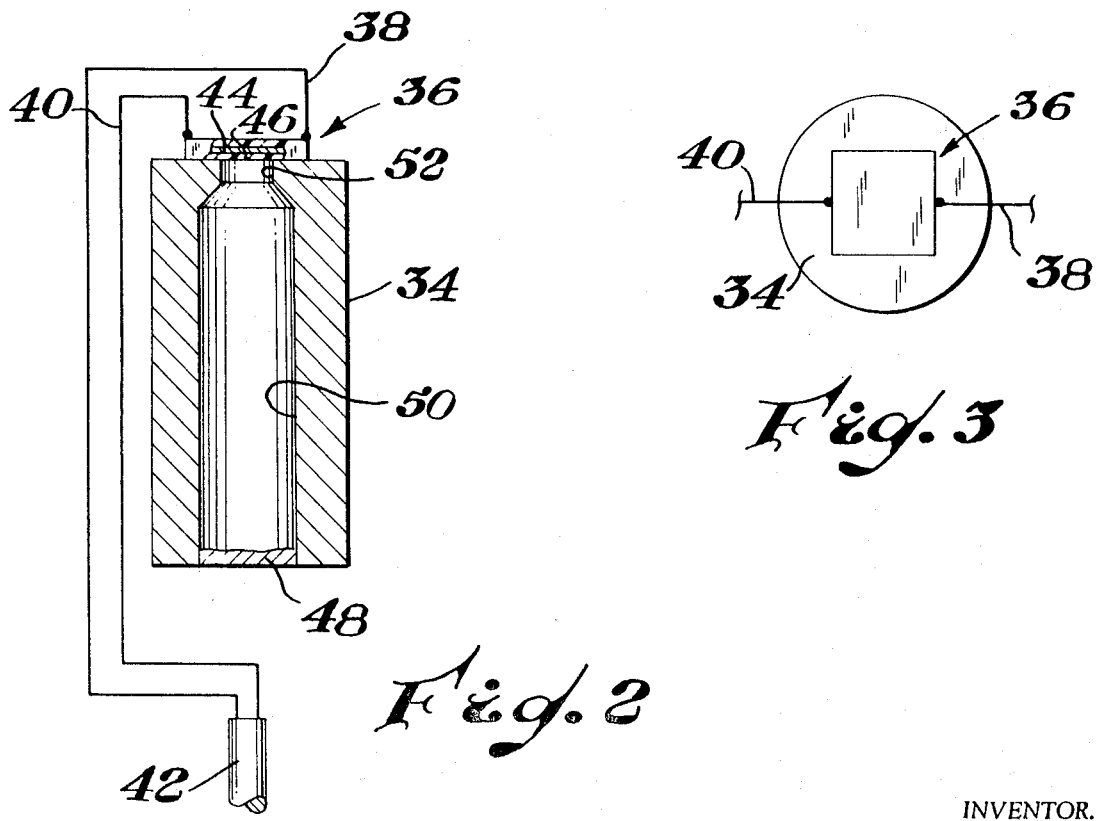
Fig. 2
Fig. 3
INVENTOR.
Thomas E. Slykhouse
BY Earl D. Ayers
AGENT

United States Patent Office 3,620,084
Patented Nov. 16, 1971

3,620,084
MINIATURE PRESSURE TRANSDUCER
Thomas E. Slykhouse, Midland, Mich., assignor to The Dow Chemical Company, Midland, Mich.
Filed June 3, 1970, Ser. No. 43,158
Int. Cl. G01i 9/06
U.S. Cl. 73—398 AR            5 Claims

ABSTRACT OF THE DISCLOSURE

This invention relates to a diaphragm type pressure gauge which is useful for measuring pressures in a system with rapidly changing pressures.

The gauge comprises a hollow cylinder of metal which has a small hole in one end and a larger hole in the other. On the outside of the cylinder across the end having the smaller hole is bonded a strain gauge which has been previously imbedded in a thin plastic film (for example any strain gauge is usable, but a semiconductor is preferred). Any bonding material may be used, but an epoxy resin is preferred.

The two or more electrical leads (two if only a single gauge is used) are insulated from the metal by placing a suitable layer of material between the leads and the cylinder. Then the leads are usually secured to the cylinder by taping, potting, etc., and fastened to a suitable electronic circuit.

BACKGROUND OF THE INVENTION

This invention relates to devices for use in measuring pressures in a system with rapidly changing pressures, and particularly to improved strain gauge devices for measuring (air) shock waves from explosive charges and having very little resonant vibration.

The usual method of measuring shock wave pressure-time functions is to use a high impedance piezoelectric crystal which generates a voltage which is a function of the pressure on the crystal. The major disadvantages of the crystal gauges are (1) friability, (2) high impedance which requires a high impedance electronic circuit, (3) difficult to manufacture, (4) leakage currents and (5) difficult to calibrate.

Another type of gauge utilizes charges generated by a plastic when shocked. This type gauge is difficult to calibrate also and is not in wide use.

The resistance of a manganin wire has been used with some success, but this is applicable only to high pressures.

Diaphragm gauges have up to this time only been useful in the very low frequency range, since the natural frequency of a shock wave is in the hundreds of kilocycles or more and the frequency of a normal diaphragm gauge is usually of the order of a few thousand kilocycles or less.

Accordingly, a principal object of this invention is to provide an improved diaphragm type pressure transducer for use in measuring shock wave pressure-time functions.

Another object of this invention is to provide an improved, simple and economical to make diaphragm type pressure transducer for use in measuring shock wave pressure-time functions.

A further object of this invention is to provide an improved diaphragm type pressure transducer which is responsive to shock waves over a wide frequency range.

In accordance with this invention there is provided a diaphragm pressure gauge which is suitable for measuring the shock waves from small explosive charges and having very little resonant vibration. It is a low impedance system which can be used with any amplifier having even relatively low input impedances. This device can be fabricated from simple, readily available materials and can be easily and quickly assembled with ordinarily available tools.

The gauge comprises a hollow cylinder of metal which has a small hole in one end and a large hole in the other. On the outside of the cylinder is bonded a strain gauge which has been previously imbedded in a thin plastic film (for example any strain gauge is usable, but a semiconductor is preferred). Any bonding material may be used, but an epoxy resin is preferred.

The two or more electrical leads (two if only a single gauge is used) are insulated from the metal by placing a suitable layer of material between the leads and the cylinder. Then the leads are secured to the cylinder by taping, potting, etc., and fastened to a suitable electronic circuit.

The invention, as well as additional objects and advantages thereof, will best be understood when the following detailed description is read in connection with the accompanying drawing, in which:

FIG. 1 shows a circuit for use with the pressure gauge of this invention;

FIG. 2 is a side elevational view, partly in section, of a pressure gauge in accordance with this invention, and FIG. 3 is a plan view of the gauge shown in FIG. 2.

Referring to the drawing, FIG. 1 shows a strain gauge element 10 coupled by lead 20 to one input terminal of a suitable readout device 16, such as a cathode ray oscilloscope.

The lead 18 from the gauge 10 is coupled through resistor 22 and lead 24 to one output terminal of a constant current source 12 and through lead 28 to one input of a pre-amplifier 14. The pre-amplifier 14 and constant current source 12 are each coupled to ground through leads 30, 26 respectively.

The output of the pre-amplifier 14 is coupled through lead 32 to the other input of the oscilloscope 16.

Referring now to FIGS. 2 and 3, there is shown a metal cylinder 34 having a bore 50 extending from one end to near to the opposite end of the cylinder. A bore 52, concentric with the bore 50 but of smaller diameter, extends inwardly from the other end of the cylinder and communicates with the bore 50.

A closure element 48 is fitted into the bore 50 at or near to the end of the bore 50 which is remote from the bore 52.

A strain gauge member 36 having electrical leads 38, 40 coupled thereto (and thence to cable 42) is cemented or otherwise rigidly coupled over the outer end of the bore 52.

The strain gauge 36 is composed of a strip 44 of semiconductor silicon bonded in an epoxy resin 46.

Usually the leads 38, 40, having been insulated from the metal cylinder 34, are coupled to the cylinder 34 to lessen the chances of the leads being damaged by the shock wave whose intensity is to be measured.

In operation, with the transducer placed several feet from the charge to be exploded and connected as shown in FIG. 1, the charge is exploded. The resulting air shock wave flexes the strain gauge which, since it is coupled to a constant current source, thus changes the voltage applied to the pre-amplifier 14 (which may be, in some instances, included in the cathode ray oscilloscope 16).

The output of the strain gauge is a function of the intensity of the shock wave and, being coupled to the vertical deflection input of the oscilloscope, is shown on the oscilloscope tube as a shock wave intensity/time display.

The rigidity of the cylinder 34, the volume within the cylinder, the size of the bore 52 compared to the dimensions of the silicon transducer element 44 and the sealing (usually cementing) of the element 44 over the bore 52 all contribute to the wide frequency range of response which is highly desirable in devices used for shock wave measuring purposes as heretofore described.

In one device made in accordance with this invention the diameter of the bore 50 was one fourth inch and the diameter of the bore 52 was between 50 and 60 mils. The length of the bore 50 is preferably 5 to 10 times the diameter of the bore 52.

In general, the smaller the diameter of the bore 52, the higher the response frequency of the device.

The transducer element was a type DEP–120–150 strain gauge having 122 ohms resistance and a gauge factor of 130, made by Kulite Semiconductor Products, 1030 White Ave., Ridgefield, N.J. The silicon element of the gauge is about ⅛ inch long by about ¹⁄₅₀ inch wide, encased in epoxy resin coating. The device is about 10–15 mils thick including the coating.

What is claimed is:

1. Pressure transducer apparatus for use in recording shock waves, comprising a metal cylinder having side walls, a first end and a second end, a large diameter axially disposed bore extending from said second end to near said first end, a small diameter bore extending inwardly from said first end and communicating with said large diameter bore, means for closing said large diameter bore, at least near to said second end, a strain gauge, said strain gauge being bonded to said first end and covering said small diameter bore, and means to couple the output of said strain gauge to external signal readout means.

2. Apparatus in accordance with claim 1, wherein said large diameter bore has a diameter at least five times the diameter of said small diameter bore.

3. Apparatus in accordance with claim 1, wherein the thickness of the side walls and ends of said cylinder is sufficient to withstand the shock wave to be measured without substantial deformation.

4. Apparatus in accordance with claim 1, wherein said strain gauge comprises a strip of semiconductor material encased in a resin.

5. Apparatus in accordance with claim 4, wherein said semiconductor material is doped silicon.

References Cited

UNITED STATES PATENTS 3,337,844   8/1967   Baltakis _____ 73—398 X

DONALD O. WOODIEL, Primary Examiner

U.S. Cl. X.R.

73—35